United States Patent
Aschenbeck (10) Patent No.: US 10,083,354 B2
(45) Date of Patent: Sep. 25, 2018

(54) ADVANCED CLOUD DETECTION USING MACHINE LEARNING AND OPTIMIZATION TECHNIQUES

(71) Applicant: DigitalGlobe, Inc., Longmont, CO (US)

(72) Inventor: Michael Aschenbeck, Arvada, CO (US)

(73) Assignee: DigitalGlobe, Inc., Westminster, CO (US)

( * ) Notice: Subject to any disclaimer, the term of this patent is extended or adjusted under 35 U.S.C. 154(b) by 12 days.

(21) Appl. No.: 15/362,254

(22) Filed: Nov. 28, 2016

(65) Prior Publication Data

US 2018/0150677 A1    May 31, 2018

(51) Int. Cl.
| | |
|---|---|
| *G06K 9/00* | (2006.01) |
| *G06K 9/46* | (2006.01) |
| *G06K 9/62* | (2006.01) |
| *G06T 7/11* | (2017.01) |

(52) U.S. Cl.
CPC ......... *G06K 9/0063* (2013.01); *G06K 9/4642* (2013.01); *G06K 9/4676* (2013.01); *G06K 9/6202* (2013.01); *G06K 9/6262* (2013.01); *G06K 9/6277* (2013.01); *G06T 7/11* (2017.01); *G06T 2207/10032* (2013.01); *G06T 2207/20021* (2013.01); *G06T 2207/30181* (2013.01)

(58) Field of Classification Search
CPC .. G06K 9/0063; G06K 9/4642; G06K 9/4676; G06K 9/6202; G06K 9/6262; G06K 9/6277; G06T 7/11; G06T 2207/10032; G06T 2207/20021; G06T 2207/30181
See application file for complete search history.

(56) References Cited

U.S. PATENT DOCUMENTS

| | | | |
|---|---|---|---|
| 9,070,285 B1* | 6/2015 | Ramu | G05D 1/0044 |
| 2005/0111692 A1* | 5/2005 | Boright | G06K 9/0063 |
| | | | 382/100 |
| 2016/0104059 A1* | 4/2016 | Wang | G01W 1/00 |
| | | | 382/103 |
| 2016/0283774 A1* | 9/2016 | Buchanan | G06K 9/0063 |
| 2017/0031056 A1* | 2/2017 | Vega-Avila | G01W 1/12 |
| 2017/0161584 A1* | 6/2017 | Guan | G06K 9/4652 |

OTHER PUBLICATIONS

Xu et al. "Cloud Removal Based on Sparse Representation via Multitemporal Dictionary Learning." IEEE Transactions on Geoscience and Remote Sensing, vol. 54, No. 5, May 2016, pp. 2998-3006.*

Liu et al. "Soft-signed Sparse Coding for Ground-based Cloud Classification." 21st International Conference on Pattern Recognition, Nov. 11, 2012, pp. 2214-2217.*

\* cited by examiner

*Primary Examiner* — Jon Chang
(74) *Attorney, Agent, or Firm* — Robert G. Crouch; Marsh Fischmann & Breyfogle LLP

(57) ABSTRACT

Techniques for automatically determining, on a pixel by pixel basis, whether imagery includes ground images or is obscured by cloud cover. The techniques include training a cloud dictionary and a ground dictionary, determining whether a given pixel is best represented by "words" from the cloud dictionary or "words" from the ground dictionary to make an initial determination of cloud or ground, and performing a max-flow, min-cut operation on the image to determine whether each pixel is a cloud or ground imagery.

18 Claims, 11 Drawing Sheets

FIG. 1

| | | | |
|---|---|---|---|
| 1 | 0 | -1 | 0 |
| 0 | 0 | 0 | 0 |
| 0 | 2 | 1 | -1 |
| 1 | 2 | 0 | -1 |

| | | | |
|---|---|---|---|
| 1 | 0 | -1 | 0 |
| 0 | 0 | 0 | 0 |
| 0 | 2 | 2 | 0 |
| 1 | 2 | 1 | 0 |

| | | | |
|---|---|---|---|
| 1 | 1 | 0 | 0 |
| 0 | 1 | 1 | 0 |
| 0 | 2 | 2 | 0 |
| 1 | 2 | 1 | 0 |

| | | | |
|---|---|---|---|
| 1 | 1 | 0 | 0 |
| 0 | 0 | 0 | 0 |
| 0 | 1 | 1 | 0 |
| 1 | 2 | 1 | 0 |

ADVANCED CLOUD DETECTION USING MACHINE LEARNING AND OPTIMIZATION TECHNIQUES

BACKGROUND

The use of geospatial imagery (e.g., satellite imagery) has continued to increase in recent years. As such, high quality geospatial imagery has become increasingly valuable. For example, a variety of different entities (e.g., government entities, corporations, individuals, or others) may utilize satellite imagery. As may be appreciated, the use of such satellite imagery may vary widely such that satellite images may be used for a variety of differing purposes.

At any given time, a significant portion of the surface of the Earth is obstructed from imaging by a satellite due to the presence of clouds. While some techniques have been used in the past to determine where and when clouds are obstructing all or portions of the Earth's surface in a geospatial image, improved techniques are desired.

It is against this background that the techniques described herein have been developed.

SUMMARY

Disclosed herein is a computer-implemented process for determining whether given imagery in an overhead image is cloud imagery or ground imagery. The process includes, for multiple portions of an image, making an initial determination about whether each of the multiple portions primarily contains cloud imagery or primarily contains ground imagery by: with a processor, utilizing words from a cloud dictionary of picture elements to describe a portion of an image; with a processor, utilizing words from a ground dictionary of picture elements to describe a portion of an image; with a processor, determining whether the cloud dictionary words or the ground dictionary words best describe the portion of imagery; and with a processor, performing an optimization technique on the multiple portions of the overhead image using the initial determination to determine which portions of the overhead image include cloud imagery or ground imagery.

The optimization technique may include identifying adjacent pixels and calculating a capacity between the identified adjacent pixels. The optimization technique may further include creating a score for each pixel to represent the likelihood that the pixel does or does not contain a cloud and creating a grid-graph of the scores of the pixels with adjacency information associated with each set of adjacent pixels. The optimization technique may further include connecting the pixels of the grid-graph to both a source and a sink using the pixel score as the capacity, wherein one of the source and the sink represents cloud and one represents ground, and performing a min-cut/max-flow segmentation on the image.

The optimization technique may include applying a window, having a height and width that are less than a height and width of the image and that are the same as that of the cloud dictionary and ground dictionary words, to various portions of the image, the various portions partially overlapping adjacent portions, in order to determine if each portion most likely contains cloud imagery or ground imagery, and incrementing or decrementing a score for each pixel in the portion based on whether the determination was of cloud imagery or ground imagery, respectively.

The overhead image may be a satellite-based image. The process may further include adding to metadata associated with each pixel an indication of whether each such pixel includes cloud imagery. The process may further include using the indication of cloud imagery in the metadata to select pixels for an orthomosaic image free of clouds.

The cloud dictionary may include multiple words that represent portions of cloud imagery and the ground dictionary may include multiple words that represent portions of ground imagery. The determining may include creating a first linear combination of the cloud words and a second linear combination of the ground words, and comparing the first and second linear combination.

Also disclosed herein is a computer-implemented process for determining whether given imagery in an overhead image is cloud imagery or ground imagery. The process includes: with a processor, utilizing words from a cloud dictionary of picture elements to describe a portion of an image; with a processor, utilizing words from a ground dictionary of picture elements to describe a portion of an image; and with a processor, determining whether the cloud dictionary words or the ground dictionary words best describe the portion of imagery.

The process may further include, with a processor, performing an optimization technique on all or larger portions of the overhead image to determine which portions of the overhead image include cloud imagery or ground imagery.

Also disclosed herein is a computer-implemented process for determining whether given imagery in an overhead image is cloud imagery or ground imagery. The process includes: for multiple portions of an image, making an initial determination about whether each of the multiple portions primarily contains cloud imagery or primarily contains ground imagery by: with a processor, utilizing words from a cloud dictionary of picture elements to describe a portion of an image; with a processor, utilizing words from a ground dictionary of picture elements to describe a portion of an image; and with a processor, determining whether the cloud dictionary words or the ground dictionary words best describe the portion of imagery; applying a window, having a height and width that are less than a height and width of the image and that are the same as that of the cloud dictionary and ground dictionary words, to various portions of the image, the various portions partially overlapping adjacent portions, in order to determine if each portion most likely contains cloud imagery or ground imagery, and incrementing or decrementing a score for each pixel in the portion based on whether the determination was of cloud imagery or ground imagery, respectively; identifying adjacent pixels and calculating a capacity between the identified adjacent pixels; creating a score for each pixel to represent the likelihood that the pixel does or does not contain a cloud; creating a grid-graph of the scores of the pixels with adjacency information associated with each set of adjacent pixels; connecting the pixels of the grid-graph to both a source and a sink using the pixel score as the capacity, wherein one of the source and the sink represents cloud and one represents ground, and performing a min-cut/max-flow segmentation on the image to define portions of the overhead image which are believed to include cloud imagery and portions of the overhead image which are believed to include ground imagery.

The overhead image may be a satellite-based image. The process may further include adding to metadata associated with each pixel an indication of whether each such pixel includes cloud imagery. The process may further include using the indication of cloud imagery in the metadata to select pixels for an orthomosaic image free of clouds.

The cloud dictionary may include multiple words that represent portions of cloud imagery and the ground dictionary includes multiple words that represent portions of ground imagery. The determining may include creating a first linear combination of the cloud words and a second linear combination of the ground words, and comparing the first and second linear combination.

Any combination of any portions of the above techniques are considered to be a part of the inventions herein.

BRIEF DESCRIPTION OF THE DRAWINGS

FIGS. $2A_1$ through $2J_2$ show how a cloud score for each pixel can be determined.

DETAILED DESCRIPTION

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

The present disclosure generally relates to functionality that may be utilized in processing of a geospatial images. For example, in an embodiment, the geospatial source images may be satellite images acquired using low earth orbit satellites such as QuickBird, WorldView-1, WorldView-2, WorldView-3, WorldView-4, IKONOS, or GeoEye-1 which are currently operated or proposed for operation by DigitalGlobe, Inc. of Longmont, Colo. However, other geospatial imagery may also be used to generate an orthomosaic as described herein such as for example, other geospatial imagery obtained from satellites other than those previously listed, high altitude aerial photograph, or other appropriate remotely sensed imagery. The images to be selected may comprise raw image data or pre-processed geospatial images (e.g., that have undergone orthorectification, pan-sharpening, or other processes known in the art that are commonly applied to geospatial imagery).

According to the present disclosure, an algorithm has been developed to detect and delimit clouds in remotely-sensed Pan and MSI imagery. In other words, on a pixel by pixel basis, to determine whether each pixel contains an image portion of a cloud or an image portion of ground imagery. And further, to determine the precise boundaries between cloud regions and non-cloud regions.

The algorithm can operate on a panchromatic (Pan) image created when the imaging sensor is sensitive to a wide range of wavelengths of light, typically spanning a large part of the visible part of the spectrum (and potentially some portions of the electromagnetic spectrum outside of the visible part). The algorithm can also or alternatively operate on any single-band image of a multispectral (MSI) image. An MSI image is one for which image data has been captured at specific wavelength bands across the electromagnetic spectrum. By way of non-limiting example, DigitalGlobe's VW-3 satellite has eight MSI bands: coastal (approximately 400-452 nm), blue (approximately 400-452 nm), green (approximately 448-510 nm), yellow (approximately 518-586 nm), red (approximately 590-630 nm), red edge (approximately 706-746 nm), near infrared 1 (NIR1) (approximately 772-890 nm), and near infrared 2 (NIR2) (approximately 866-954 nm). It could also be applied to hyperspectral or other types of imagery.

In what follows, the term "input image" will refer to a generic grayscale image. Any multi-band image, as discussed above, may have one band extracted and used as a single band grayscale image. The algorithm utilizes Sparse Coding for Dictionary Learning and Max-flow/Min-cut Segmentation. At least the adaptation of these ideas to cloud detection and the manner in which they are adapted is believed to be novel.

Generally, a first dictionary of "cloud words" is created. This "cloud dictionary" includes a number of picture elements of clouds, and these picture elements are called the cloud words. A second dictionary of "ground words" is created. This "ground dictionary" includes a number of picture elements of the surface of the Earth (and the things built, formed, or growing thereon), and these picture elements are called the ground words.

To create these dictionaries, a training step is required in advance. First, a cloud training set is compiled on only known cloud patches. A patch refers to a normalized k×k square of pixels (and their values) in the input image. A known cloud patch is a patch that has manually been deemed to be within a cloud. Each of these k×k cloud patches is reshaped as a column vector in $k^2$-dimensional space (using any linear indexing scheme for the k×k array of pixels). A cloud training matrix is constructed with these reshaped cloud patches. It is from this matrix, that a dictionary is created using sparse coding.

Next, and similarly, the ground dictionary is trained on only ground patches.

The dictionaries are found using sparse coding. A sparse coding dictionary is a collection (dictionary) of (generally contrived) patches (reshaped as column vectors) such that any patch in the training set can be well-approximated by a sparse linear combination of patches in the dictionary. The number of patches in the training set and in the sparse coding dictionary is typically larger than $k^2$. Various algorithms are known in the literature for constructing a sparse coding dictionary from a training set.

Figure 1:
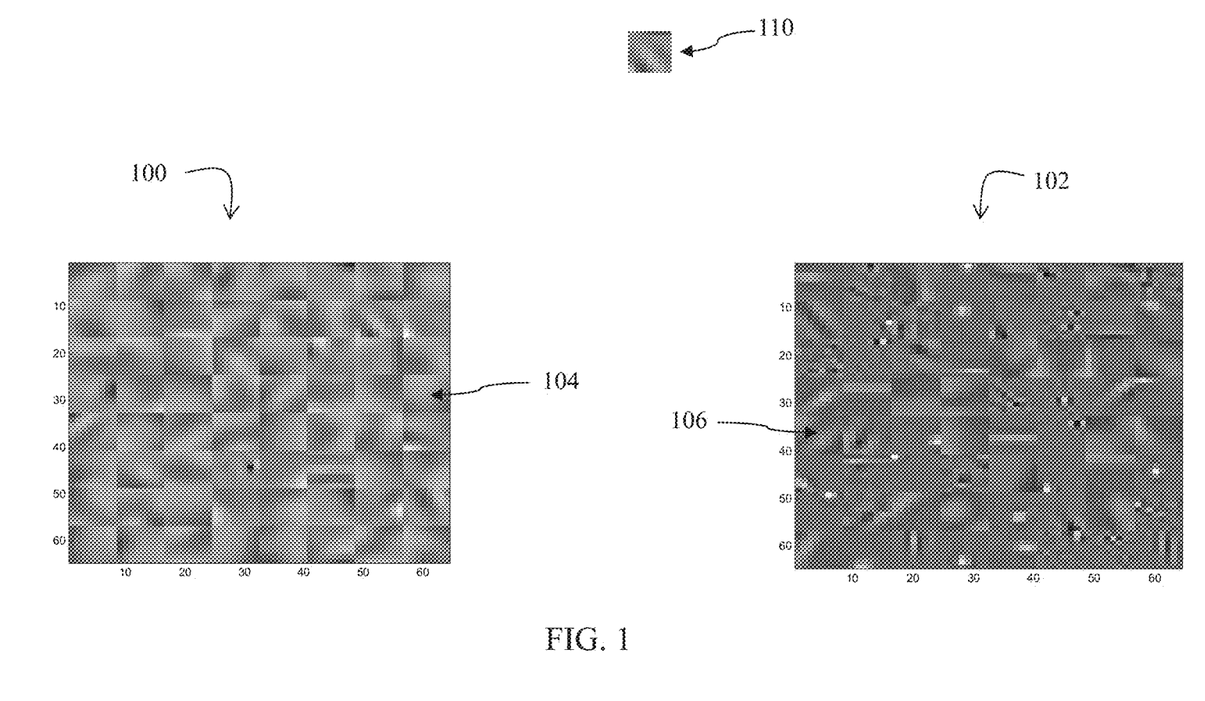
FIG. 1 is an illustration of a cloud dictionary and a ground dictionary.

FIG. 1 shows examples of such a cloud dictionary 100 and a ground dictionary 102. As can be seen, the cloud dictionary 100 includes 64 different cloud words 104, which in this illustration are shown arranged in an 8×8 array. Close inspection shows that each cloud word 104 is composed of an 8×8 array of pixels. Similarly, the ground dictionary 102 includes 64 different ground words 106, which in this illustration are shown arranged in an 8×8 array. Close inspection shows that each ground word 106 is composed of an 8×8 array of pixels. As can be appreciated, either or both of the dictionaries may contain more or less different words, such as 128 words.

Figure 8:
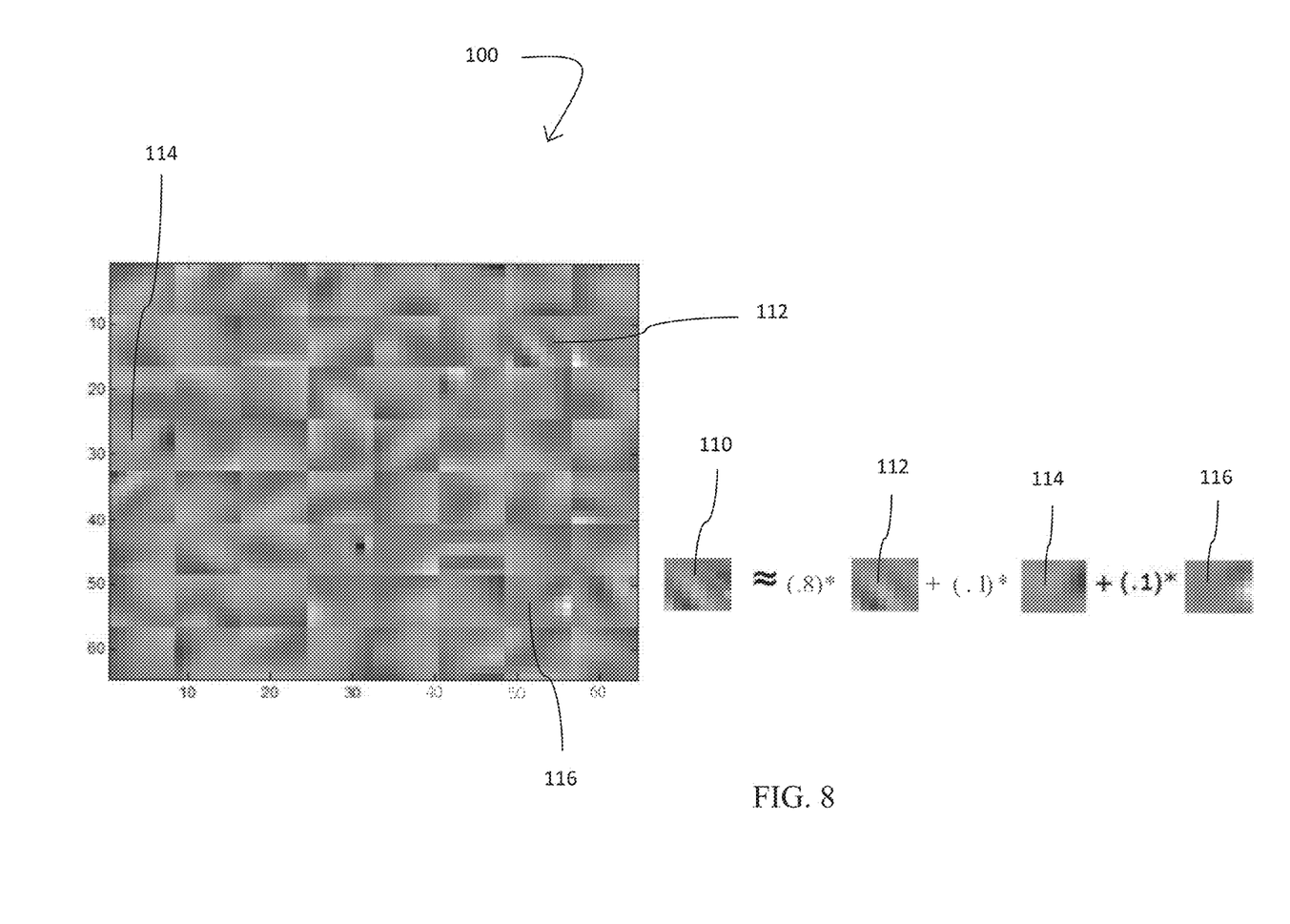
FIG. 8 is an illustration of a cloud dictionary, a patch from an input image, and a linear combination of words from the cloud dictionary.

Also shown in FIG. 1 is an example patch 110 from an input image to be classified as cloud or non-cloud. Further detail is shown in FIG. 8, it which it can be seen that three particular cloud words, words 112, 114, and 116 (particularly word 112) are similar to the patch 110 and could be used in a linear combination (perhaps in combination with other words) to fairly accurately represent the patch 110. The linear combination is illustrated in the drawing. On the other hand, and referring back to FIG. 1, it can be seen that none of the ground words 106 would fairly accurately represent the patch 110, either alone or in a sparse linear combination.

In order to automatically make a determination as to whether or not an image patch is most likely to contain a cloud or to be cloud-free, a processor determines the best representation of the image patch using solely words from the cloud dictionary 100 and also determines the best representation of the image patch using solely words from the ground dictionary 102. When computing this representation, it may be important to use a small sparsity constraint which matches or is close to the one used for training. For example, if the dictionaries were trained to yield good representations using only 3 words, then only 3 words should be used in this step. The two representations could each be compared to the original patch and a determination is made as to which representation more accurately represented the image patch. The outcome of that determination is an initial classification of the image patch as cloud or non-cloud.

Again, in the first phase of the algorithm, every pixel is assigned a net cloud score as follows. First, the net cloud score of every pixel in the input image is set to 0. Next, for every (possibly overlapping) k×k patch P in the input image (processed as a $k^2$-dimensional vector): (a) approximate it as a sparse linear combination of patches in the cloud dictionary; (b) approximate it as a sparse linear combination of patches in the ground dictionary; and (c) add +1 to the net cloud score of every pixel in P if the cloud dictionary approximation to P is more accurate than the ground dictionary approximation to P. Otherwise, add −1 to the net cloud score of every pixel in P. The respective approximations are computed using "Orthogonal Matching Pursuit" (defined in the literature) to find the linear combination of dictionary elements that best represents the patch. The accuracy could be measured with L1, L2, L-infinity, and so forth. For example, for an input patch y and an approximation y, the accuracy can be measured with an $L^2$ norm: $\|y-\hat{y}\|_2 = \sqrt{\Sigma_i (y\_i - \hat{y}\_i)^2}$. Similarly, one can use any norm on a $k^2$-dimensional vector space.

Figure 2A:
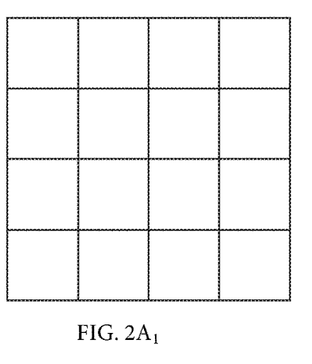
Figure 2A:
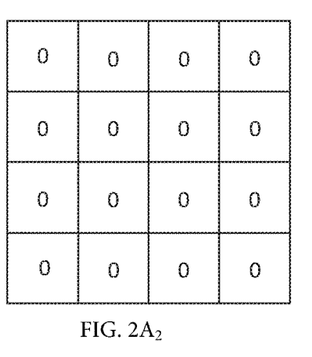
Figure 2B:
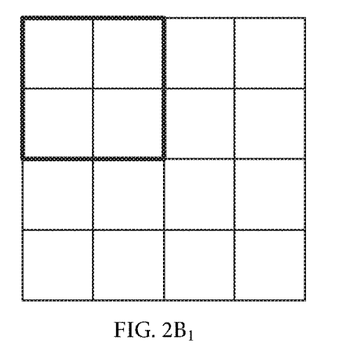
Figure 2B:
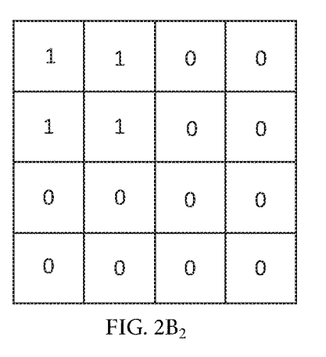
Figure 2C:
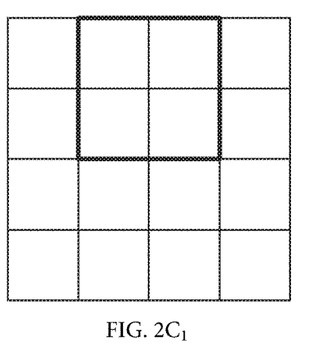
Figure 2C:
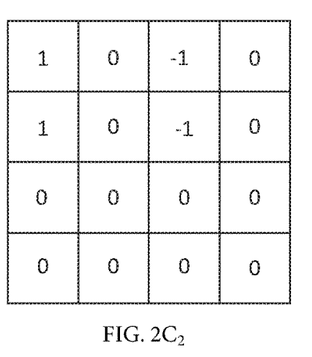
Figure 2D:
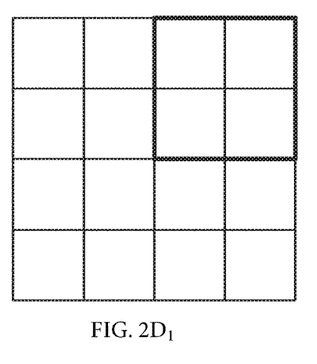
Figure 2D:
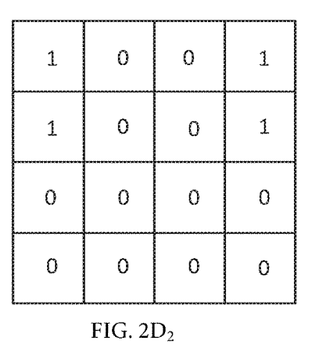
Figure 2E:
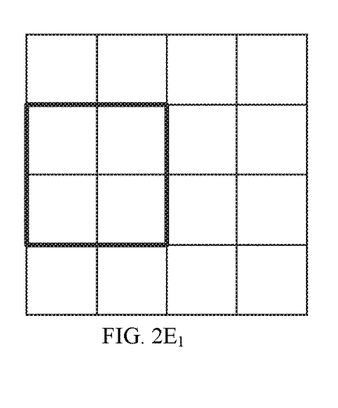
Figure 2F:
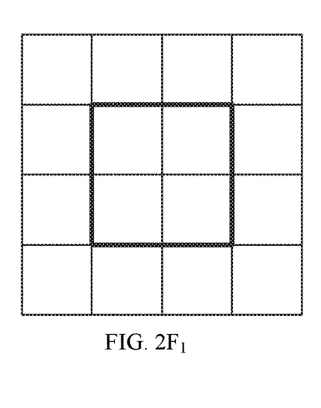
Figure 2G:
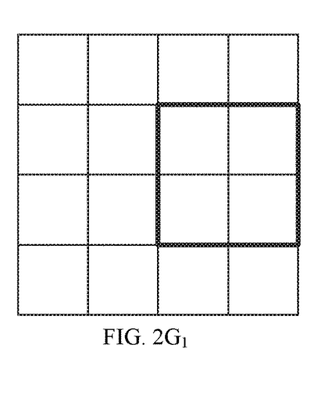
Figure 2H:
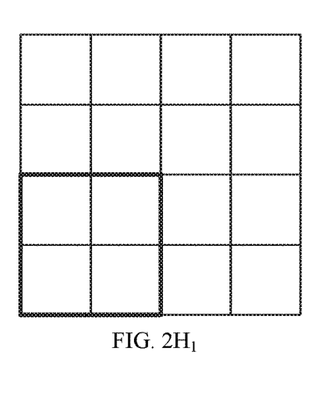
Figure 2I:
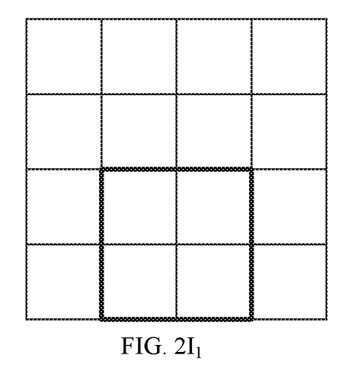
Figure 2I:
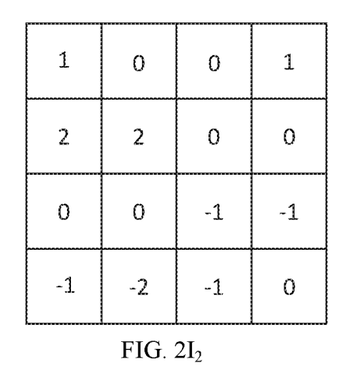
Figure 2J:
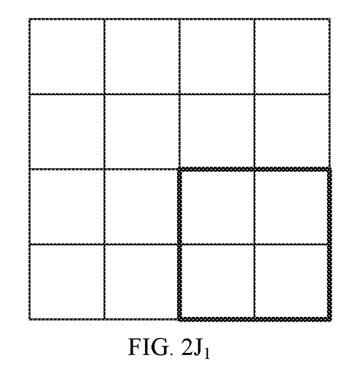

A simplified example with a 4×4 array of pixels is described below and illustrated in FIG. 2. As shown in FIG. 2A₂, the 4×4 array is back-filled with a score of 0 in each position (pixel). Then in $B_1$, it is illustrated that a 2×2 portion of the array is looked at and the initial classification was determined to be a cloud. If it had been determined that this image patch was a non-cloud, then a value of −1 would have been added to the corresponding pixels in $A_2$ to get the score shown in $B_2$. But since in this example, the initial classification was "cloud," then a value of +1 is added to the corresponding pixels in $A_2$ to get the score shown in $B_2$. So, $B_2$ shows the result after +1 was added to each of the four most upper left pixels.

Next, the 2×2 window is slid over so that it is in the position shown in $C_1$. In this example, the initial classification of that patch was non-cloud, so a value of −1 is added to the corresponding pixels and the resulting score is shown in $C_2$. After that, the 2×2 window is slid over so that it is in the position shown in $D_1$. In this example, the initial classification of that patch was cloud, so a value of +1 is added to the corresponding pixels and the resulting score is shown in $D_2$.

Following this, the 2×2 window is moved down a row and slid into the positions shown in $E_1$. In this example, that patch had an initial classification of cloud and a value of +1 is added to the corresponding pixels in $E_2$. After that, the 2×2 window is slid over so that it is in the position shown in $F_1$. In this example, the initial classification of that patch was cloud, so a value of +1 is added to the corresponding pixels and the resulting score is shown in $F_2$. Next, the 2×2 window is slid over so that it is in the position shown in $G_1$. In this example, the initial classification of that patch was non-cloud, so a value of −1 is added to the corresponding pixels and the resulting score is shown in $G_2$.

Following this, the 2×2 window is moved down a row and slid into the positions shown in $H_1$. In this example, that patch had an initial classification of non-cloud and a value of −1 is added to the corresponding pixels in $H_2$. After that, the 2×2 window is slid over so that it is in the position shown in $I_1$. In this example, the initial classification of that patch was non-cloud, so a value of −1 is added to the corresponding pixels and the resulting score is shown in $I_2$. Next, the 2×2 window is slid over so that it is in the position shown in $J_1$. In this example, the initial classification of that patch was non-cloud, so a value of −1 is added to the corresponding pixels and the resulting score is shown in $J_2$.

Figure 2J:
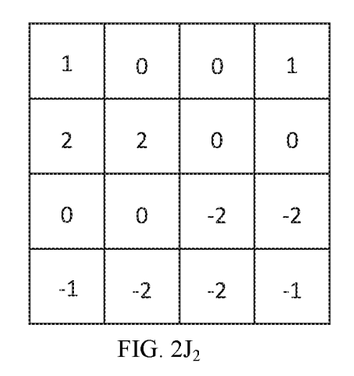

With this portion of the processing done, it can be seen that certain pixels in the 4×4 array of FIG. 2J₂ shows values of 2 while other pixels show values of −2 and other pixels have more intermediate values. Of course, the algorithm is in the middle of determining that certain pixels are very likely to be clouds and certain other pixels are very likely to be non-cloud, whereas for other pixels, the algorithm may not be as certain about the contents of that pixel.

Figure 3:
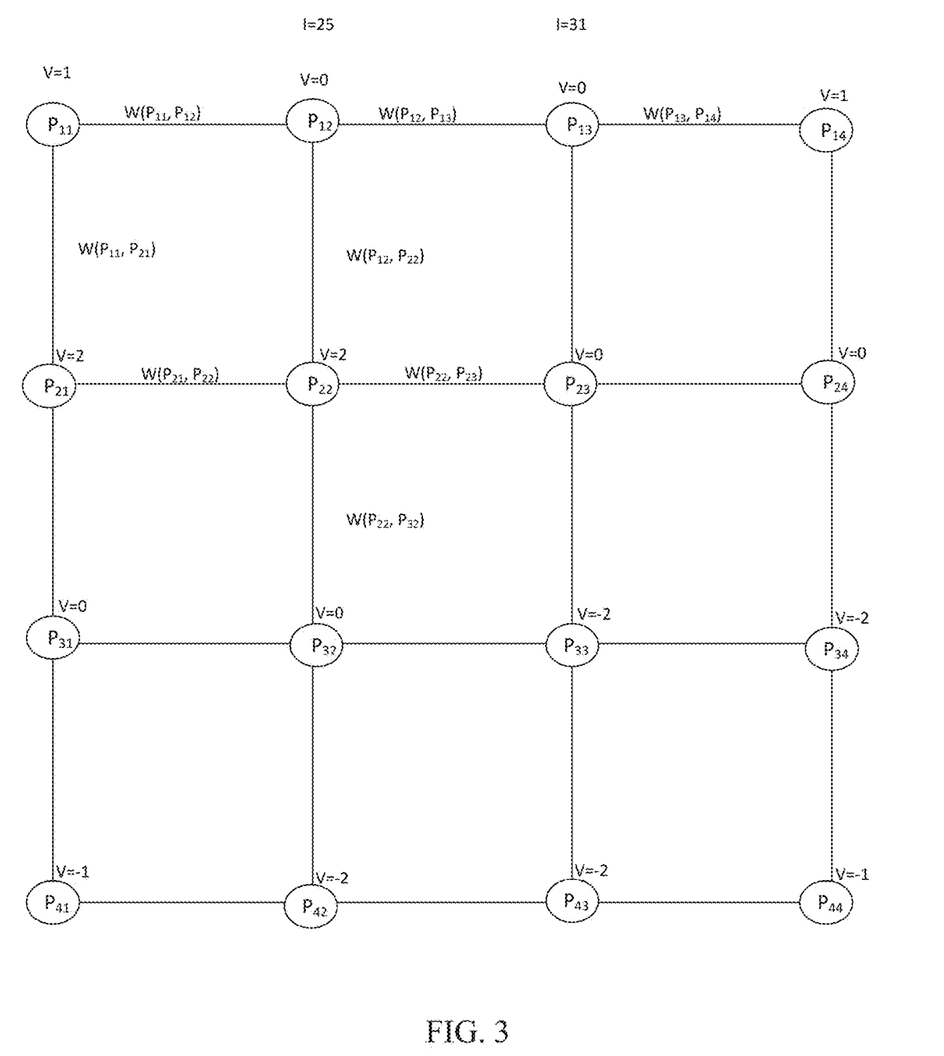
FIG. 3 shows a grid-graph of the cloud scores for a 4×4 array of pixels in an image.

In the second phase, a flow-graph is built for min-cut/max-flow segmentation. This is done by first creating a grid-graph whose vertices are the pixels of the input image and whose bi-directional edges are the 4-way adjacencies between pixels in the image. With reference back to the simplified example, the information in the 4×4 array of FIG. 2J₂ is then transferred to the grid-graph representation shown in FIG. 3, where the cloud score from FIG. 2J₂ is represented as V for each pixel. Note that each pixel has a score (V) and an intensity value (I, from the image) and each pixel shows a line connecting it to each adjacent pixel in the same row or column. Each of those lines can be seen to represent a capacity (w), which is a measure of the similarity between the score of the two adjacent pixels. For example, capacity could be calculated as:

$$w = e^{-|x-y|}, \text{ or alternatively:}$$

$$w = e^{-(x-y)^2 \sigma^{-2}}$$

The following notation can be used:
$p_{ij}$ refers to the pixel in row i and in column j
$w(x,y)$ refers to the capacity between pixel x and pixel y V(x) refers to the cloud or ground capacity of pixel x (if a positive value, then it is a cloud, and if a negative value, then it is the ground)

I(x) refers to the image intensity value of pixel x

Figure 4:
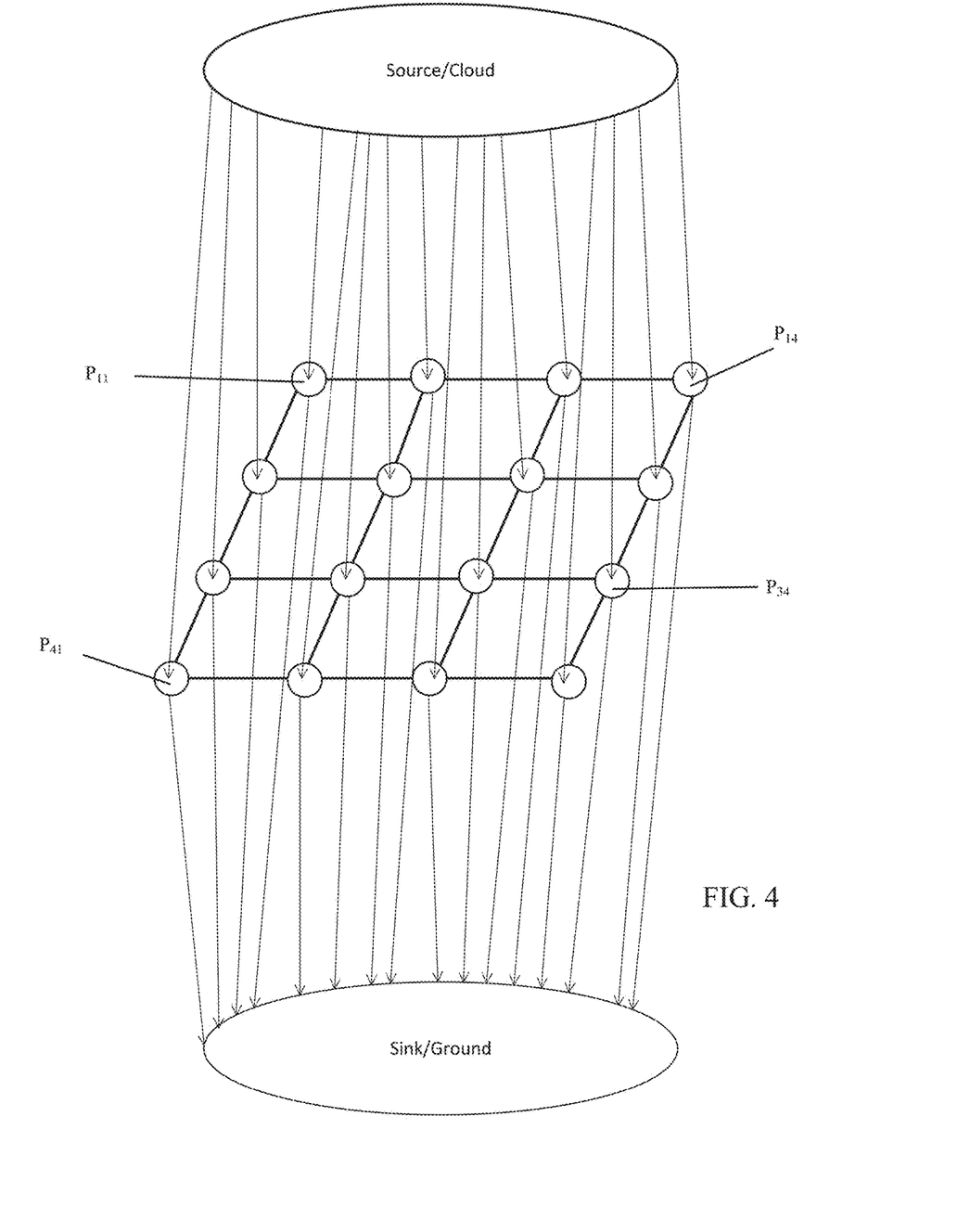
FIG. 4 shows the grid-graph connected to a source and a sink as part of a Min-Cut, Max-Flow technique.

Second, a new source vertex and new sink vertex are contrived. The grid-graph is represented in FIG. 4, where a connection is shown from each pixel to each of a source/cloud and to a sink/ground.

Third, a directional edge from the source vertex to vertex v (pixel $p_{ij}$) in the grid-graph is created if v's net cloud score (V) is positive (v is more like cloud than ground). A positive capacity is put on this edge. It may be a constant value or proportional to the absolute value of the cloud score of v. Alternatively, the source has a directional edge to every vertex v of the grid-graph whose weight is the cloud score (not-netted) of the vertex v.

Figure 9:
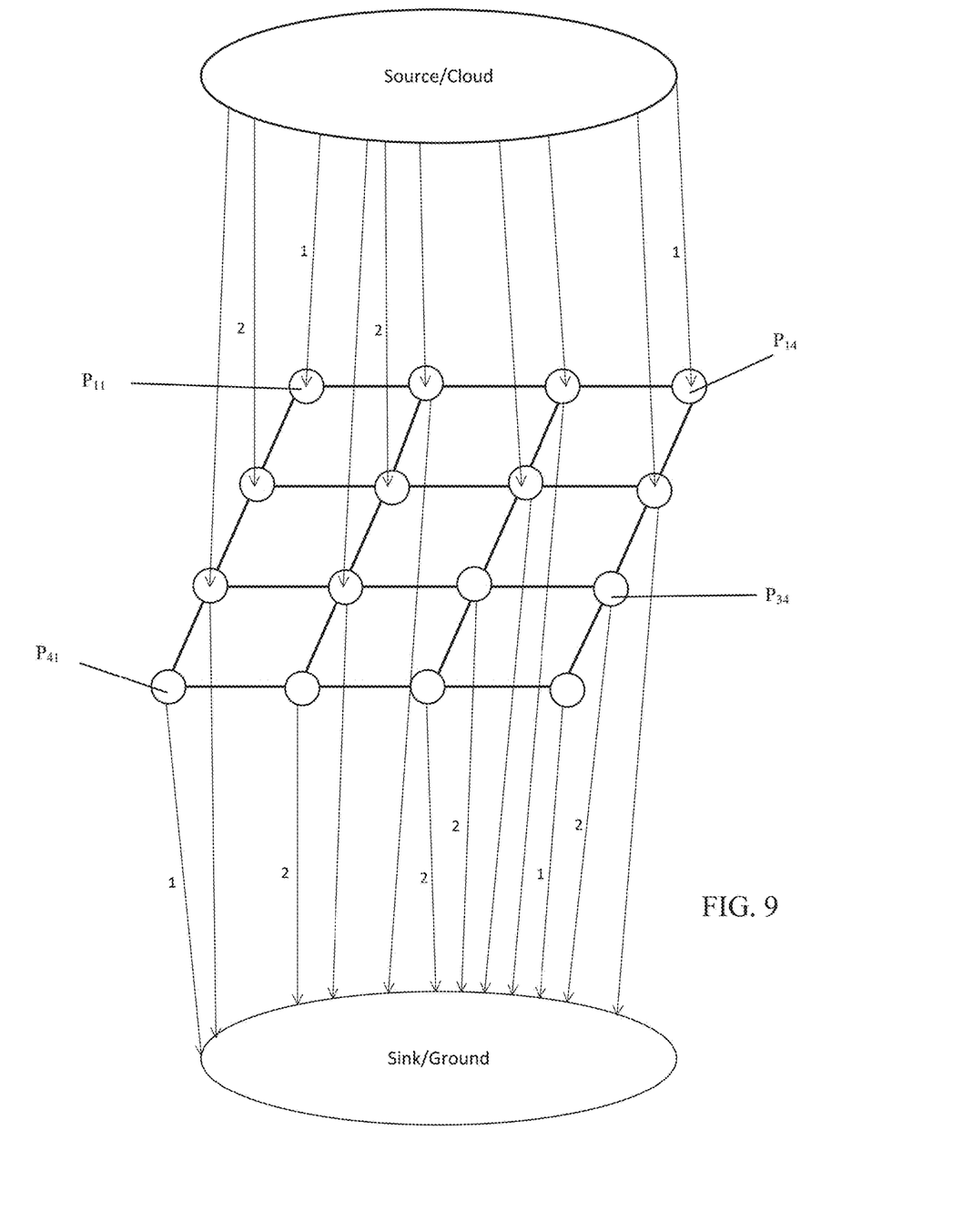
FIG. 9 shows the grid-graph connected to the source and the sink of FIG. 4, after the capacities have been assigned between the pixels/vertices the applicable one or both of the source and sink.

Fourth, a directional edge is created from vertex v in the grid-graph to the sink vertex if v's net cloud score is negative (v is more like ground than cloud). A positive capacity is put on this edge. It may be a constant value or proportional to the absolute value of the cloud score of v. Alternatively, there is a directional edge from every vertex v of the grid-graph to the sink whose weight is the ground score of the vertex v. FIG. 9 shows the grid-graph after the directional edge capacities have been placed thereon. Note that unlabeled directional edges have a capacity of zero, and when a non-zero capacity is assigned to a directional edge between a given vertex and the source, then the directional edge between that vertex and the sink is then removed.

Fifth, a capacity value is assigned to each edge (u, v) in the grid-graph, where that value depends on the grayscale similarity between pixel u and pixel v in the input image. The larger the discrepancy, the smaller the capacity; the smaller the discrepancy, the larger the capacity. One possible implementation is to use a Gaussian of the difference. Since it may be helpful to segment the cloud and non-cloud portions of the image along edges or transitions in the image, it can be seen that the capacity between adjacent pixels will be smaller when the intensity differences are larger. So, seeking to segment between pixels with large intensity differences may be desirable.

Sixth, when available, auxiliary information known about cloud or ground pixels are incorporated into the graph as follows. If a pixel ($p_{ij}$) is known to be a cloud, a directional edge is created from v to the source with a very large capacity. If $p_{ij}$ is known to be ground, a directional edge is created from $p_{ij}$ to the sink with a very large capacity. This auxiliary information may be available from manual annotations or other means.

Seventh, the min-cut partition of the graph (typical algorithms do this by finding the max-flow) between source and sink is solved for. This is a partition of the graph into two sets of vertices, one that contains the sink, the other that contains the source, and such that the total capacity of edges that span the two sets is as small as possible (meaning that the intensity differences are larger). There are many methods to solve for this partition. Some of the most common methods are the Ford-Fulkerson algorithm, the Push Relabel Max-Flow algorithm, Dinic's algorithm, and the Boykov-Kolmogorov Max-Flow algorithm.

Eighth, the above partition induces the division of the input image into cloud regions (including pixels grouped with the source) and ground regions (including pixels grouped with the sink).

Ninth, automatic clean-up operations are applied on the cloud regions (to get rid of small regions or thin stringy regions).

Several further comments can be made about this algorithm. Cloud textures display repeatable patterns that are usually different than other features' textures present in imagery. These textures are difficult to describe heuristically, but can be learned with the process described above. The cloud dictionary is specialized to represent these textures with few dictionary elements, while the ground dictionary will not represent these textures well with few dictionary elements. Patches are normalized, thus the average intensity of each patch plays no role in the weighting. This will ensure that, while mainly determined by the cloud score, classification follows natural transitions in the image. A thresholded cloud score itself contains many false positives and false negatives. This application of the Min-cut/Max-flow segmenter is very important for this reason as it smoothes out the incorrect scores in an intuitive way.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Figure 5:
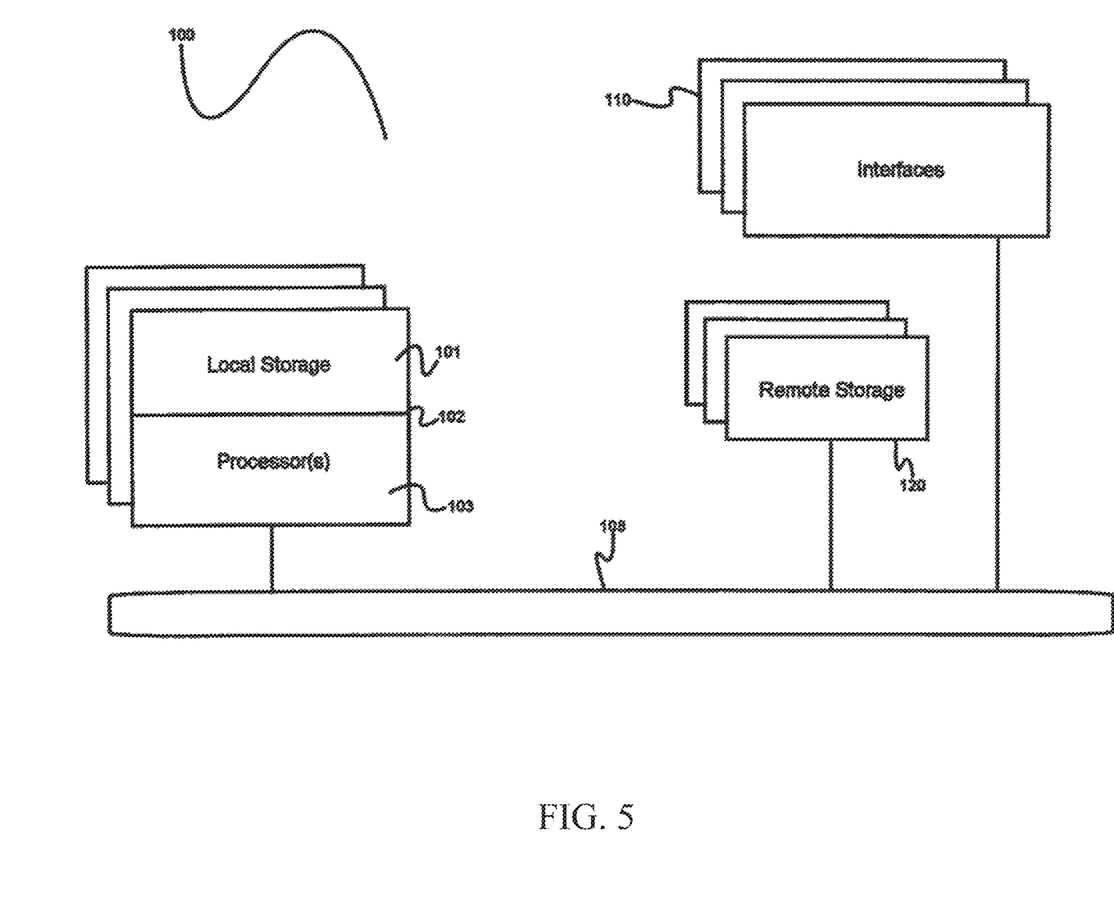
FIG. 5 is a block diagram illustrating an exemplary hardware architecture of a computing device used in an embodiment of the disclosure herein.

Referring now to FIG. 5, there is shown a block diagram depicting an exemplary computing device 230 suitable for implementing at least a portion of the features or functionalities disclosed herein. Computing device 230 may be, for example, any one of the computing machines listed in the previous paragraph, or indeed any other electronic device capable of executing software- or hardware-based instructions according to one or more programs stored in memory. Computing device 230 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 230 includes one or more central processing units (CPU) 234, one or more interfaces 240, and one or more busses 238 (such as a peripheral component interconnect (PCI) bus). When acting under the control of appropriate software or firmware, CPU 234 may be responsible for implementing specific functions associated with the functions of a specifically configured computing device or machine. For example, in at least one embodiment, a computing device 230 may be configured or designed to function as a server system utilizing CPU 234, local memory 232 and/or remote memory 242, and interface(s) 240.

In at least one embodiment, CPU 234 may be caused to perform one or more of the different types of functions and/or operations under the control of software modules or components, which for example, may include an operating system and any appropriate applications software, drivers, and the like. CPU 234 may include one or more processors 236 such as, for example, a processor from one of the Intel, ARM, Qualcomm, and AMD families of microprocessors. In some embodiments, processors 236 may include specially designed hardware such as application-specific integrated circuits (ASICs), electrically erasable programmable read-only memories (EEPROMs), field-programmable gate arrays (FPGAs), and so forth, for controlling operations of computing device 230. In a specific embodiment, a local memory 232 (such as non-volatile random access memory (RAM) and/or read-only memory (ROM), including for example one or more levels of cached memory) may also form part of CPU 234. However, there are many different ways in which memory may be coupled to system 230. Memory 232 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 240 are provided as network interface cards (NICs). Generally, NICs control the sending and receiving of data packets over a computer network; other types of interfaces 240 may for example support other peripherals used with computing device 230. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth near-field communications (e.g., using near-field magnetics), 802.11 (WFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 240 may include ports appropriate for communication with appropriate media. In some cases, they may also include an independent processor and, in some instances, volatile and/or non-volatile memory (e.g., RAM).

Although the system shown in FIG. 5 illustrates one specific architecture for a computing device 230 for implementing one or more of the embodiments described herein, it is by no means the only device architecture on which at least a portion of the features and techniques described herein may be implemented. For example, architectures having one or any number of processors 236 may be used, and such processors 236 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 242 and local memory 232) configured to store data, program instructions for the general-purpose network operations, or other information relating to the functionality of the embodiments described herein (or any combinations of the above). Program instructions may control execution of or comprise an operating system and/or one or more applications, for example. Memory 242 or memories 232, 242 may also be configured to store data structures, configuration data, encryption data, historical system operations information, or any other specific or generic non-program information described herein.

Because such information and program instructions may be employed to implement one or more systems or methods described herein, at least some network device embodiments may include non-transitory machine-readable storage media, which, for example, may be configured or designed to store program instructions, state information, and the like for performing various operations described herein. Examples of such non-transitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Groovy, or any other scripting language).

Figure 6:
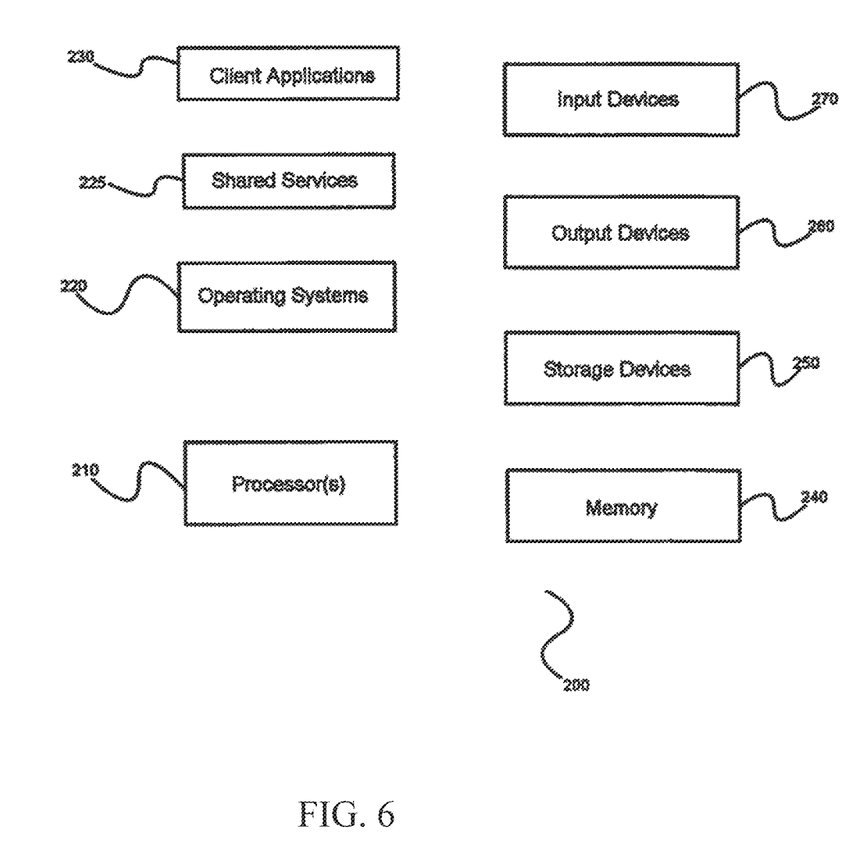
FIG. 6 is a block diagram illustrating an exemplary logical architecture for a client device, according to an embodiment of the disclosure herein.

In some embodiments, systems may be implemented on a standalone computing system. Referring now to FIG. 6, there is shown a block diagram depicting a typical exemplary architecture of one or more embodiments or components thereof on a standalone computing system. Computing device 250 includes processors 252 that may run software that carry out one or more functions or applications of embodiments, such as for example a client application 258. Processors 252 may carry out computing instructions under control of an operating system 254 such as, for example, a version of Microsoft's Windows operating system, Apple's Mac OS/X or iOS operating systems, some variety of the Linux operating system, Google's Android operating system, or the like. In many cases, one or more shared services 256 may be operable in system 250, and may be useful for providing common services to client applications 258. Services 256 may for example be Windows services, user-space common services in a Linux environment, or any other type of common service architecture used with operating system 254. Input devices 266 may be of any type suitable for receiving user input, including for example a keyboard, touchscreen, microphone (for example, for voice input), mouse, touchpad, trackball, or any combination thereof. Output devices 264 may be of any type suitable for providing output to one or more users, whether remote or local to system 250, and may include for example one or more screens for visual output, speakers, printers, or any combination thereof. Memory 260 may be random-access memory having any structure and architecture known in the art, for use by processors 252, for example to run software. Storage devices 262 may be any magnetic, optical, mechanical, memristor, or electrical storage device for storage of data in digital form. Examples of storage devices 262 include flash memory, magnetic hard drive, CD-ROM, and/or the like.

Figure 7:
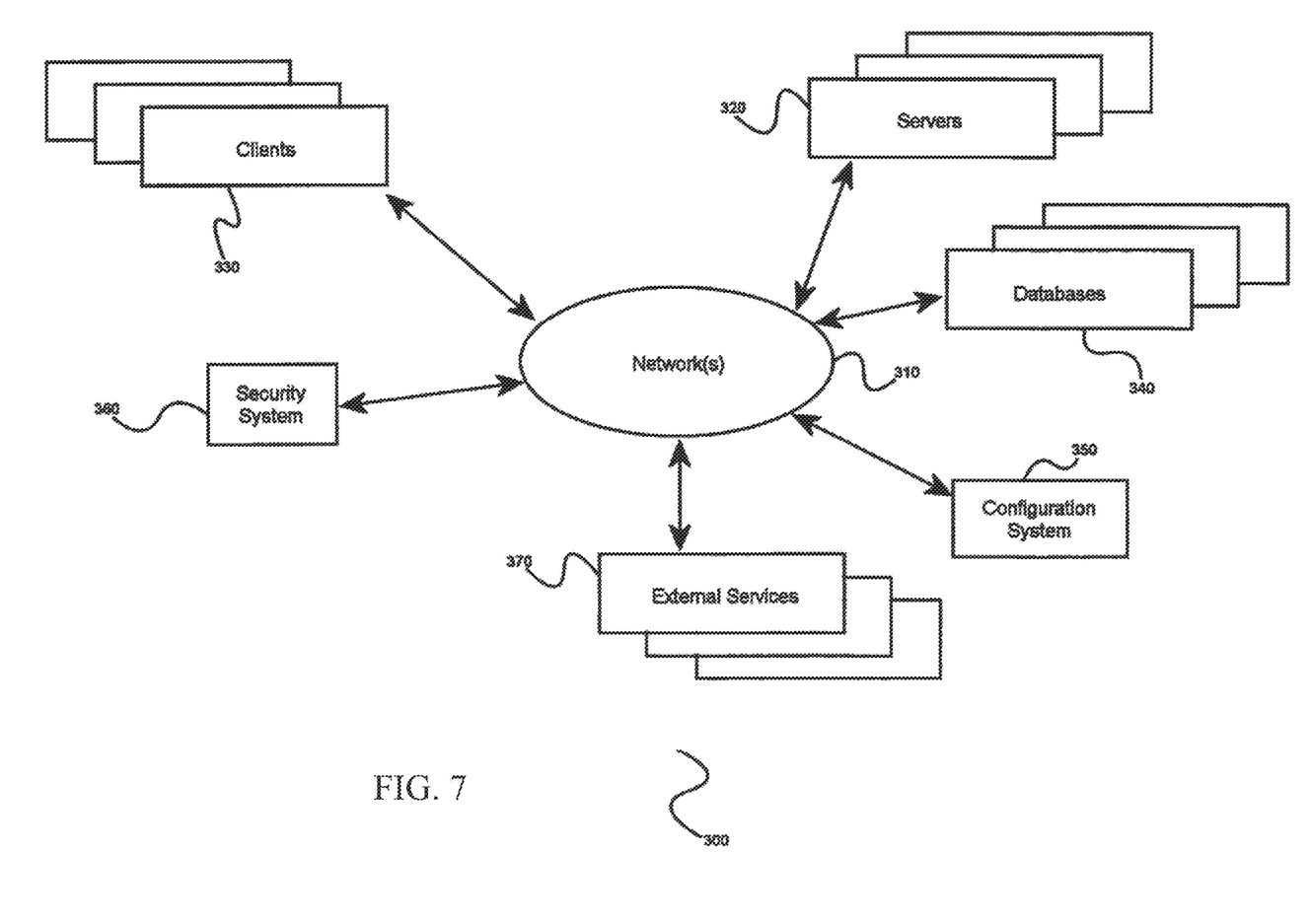
FIG. 7 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 7, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 250 such as that illustrated in FIG. 6. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 258 are implemented on a smartphone or other electronic device, client applications 258 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A computer-implemented process for determining whether given imagery in an overhead image is cloud imagery or ground imagery, comprising:

for multiple portions of an image, making an initial determination about whether each of the multiple portions primarily contains cloud imagery or primarily contains ground imagery by:
with a processor, utilizing words from a cloud dictionary of picture elements to describe a first portion of the image;
with a processor, utilizing words from a ground dictionary of picture elements to describe the first portion of the image;
with a processor, determining whether the cloud dictionary words or the ground dictionary words best describe the first portion of the image; and
with a processor, performing an optimization technique on the multiple portions of the overhead image using the initial determination to determine which portions of the overhead image include cloud imagery or ground imagery.

2. A computer-implemented process as defined in claim 1, wherein the optimization technique includes identifying adjacent pixels and calculating a capacity between the identified adjacent pixels.

3. A computer-implemented process as defined in claim 2, wherein the optimization technique further includes creating a score for each pixel to represent the likelihood that the pixel does or does not contain a cloud and creating a grid-graph of the scores of the pixels with adjacency information associated with each set of adjacent pixels.

4. A computer-implemented process as defined in claim 3, wherein the optimization technique further includes connecting the pixels of the grid-graph to both a source and a sink using the pixel score as the capacity, wherein one of the source and the sink represents cloud and one represents ground, and performing a min-cut/max-flow segmentation on the image.

5. A computer-implemented process as defined in claim 1, wherein the optimization technique includes applying a window, having a height and width that are less than a height and width of the image and that are the same as that of the cloud dictionary and ground dictionary words, to various portions of the image, the various portions partially overlapping adjacent portions, in order to determine if each portion most likely contains cloud imagery or ground imagery, and incrementing or decrementing a score for each pixel in the portion based on whether the determination was of cloud imagery or ground imagery, respectively.

6. A computer-implemented process as defined in claim 1, wherein the overhead image is a satellite-based image.

7. A computer-implemented process as defined in claim 1, further including adding to metadata associated with each pixel an indication of whether each such pixel includes cloud imagery.

8. A computer-implemented process as defined in claim 7, further including using the indication of cloud imagery in the metadata to select pixels for an orthomosaic image free of clouds.

9. A computer-implemented process as defined in claim 1, wherein the cloud dictionary includes multiple words that represent portions of cloud imagery and the ground dictionary includes multiple words that represent portions of ground imagery.

10. A computer-implemented process as defined in claim 1, wherein the determining includes creating a first linear combination of the words from the cloud dictionary and a second linear combination of the words from the ground dictionary, and comparing the first and second linear combinations.

11. A computer-implemented process for determining whether given imagery in an overhead image is cloud imagery or ground imagery, comprising:
  with a processor, utilizing words from a cloud dictionary of picture elements to describe a portion of an image;
  with a processor, utilizing words from a ground dictionary of picture elements to describe the portion of the image; and
  with a processor, determining whether the cloud dictionary words or the ground dictionary words best describe the portion of the image.

12. A computer-implemented process as defined in claim 11, further including:
  with a processor, performing an optimization technique on a plurality of portions of the overhead image including the portion of the overhead image to determine which portions of the overhead image include cloud imagery or ground imagery.

13. A computer-implemented process for determining whether given imagery in an overhead image is cloud imagery or ground imagery, comprising:
  for multiple portions of an image, making an initial determination about whether each of the multiple portions primarily contains cloud imagery or primarily contains ground imagery by:
    with a processor, utilizing words from a cloud dictionary of picture elements to describe a first portion of the image;
    with a processor, utilizing words from a ground dictionary of picture elements to describe the first portion of the image; and
    with a processor, determining whether the cloud dictionary words or the ground dictionary words best describe the first portion of the image;
  applying a window, having a height and width that are less than a height and width of the image and that are the same as that of the cloud dictionary and ground dictionary words, to various portions of the image, the various portions partially overlapping adjacent portions, in order to determine if each portion most likely contains cloud imagery or ground imagery, and incrementing or decrementing a score for each pixel in the portion based on whether the determination was of cloud imagery or ground imagery, respectively;
  identifying adjacent pixels and calculating a capacity between the identified adjacent pixels;
  creating a score for each pixel to represent the likelihood that the pixel does or does not contain a cloud;
  creating a grid-graph of the scores of the pixels with adjacency information associated with each set of adjacent pixels;
  connecting the pixels of the grid-graph to both a source and a sink using the pixel score as the capacity, wherein one of the source and the sink represents cloud and one represents ground; and
  performing a min-cut/max-flow segmentation on the image to define portions of the overhead image which are believed to include cloud imagery and portions of the overhead image which are believed to include ground imagery.

14. A computer-implemented process as defined in claim 13, wherein the overhead image is a satellite-based image.

15. A computer-implemented process as defined in claim 13, further including adding to metadata associated with each pixel an indication of whether each such pixel includes cloud imagery.

16. A computer-implemented process as defined in claim 15, further including using the indication of cloud imagery in the metadata to select pixels for an orthomosaic image free of clouds.

17. A computer-implemented process as defined in claim 13, wherein the cloud dictionary includes multiple words that represent portions of cloud imagery and the ground dictionary includes multiple words that represent portions of ground imagery.

18. A computer-implemented process as defined in claim 13, wherein the determining includes creating a first linear combination of the words from the cloud dictionary and a second linear combination of the words from the ground dictionary, and comparing the first and second linear combinations.

* * * * *